W. M. Rennyson.
Lubricator.
N° 84,135.     Patented Nov. 17, 1868
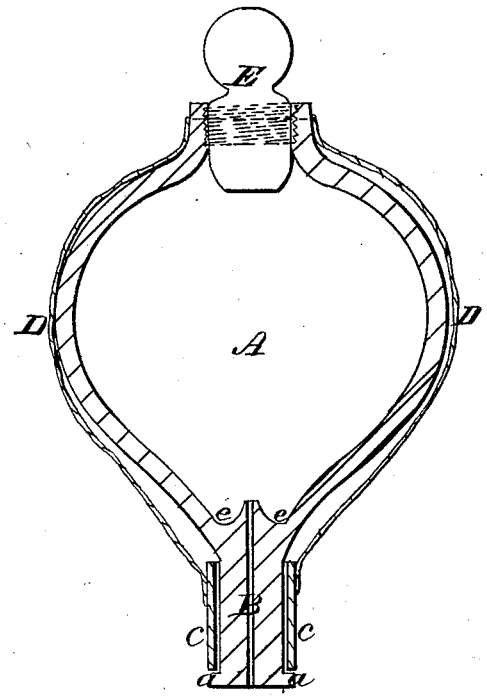
Witnesses
Leopold Evert
O. M. Smith
Inventor
Wm. M. Rennyson
per Alexander & Mason
Attys

WILLIAM M. RENNYSON, OF POTTSVILLE, PENNSYLVANIA.

Letters Patent No. 84,135, dated November 17, 1868.

IMPROVEMENT IN LUBRICATORS.

The Schedule referred to in these Letters Patent and making part of the same.

*To all whom it may concern:*

Be it known that I, WILLIAM M. RENNYSON, of Pottsville, in the county of Schuylkill, and in the State of Pennsylvania, have invented certain new and useful Improvements in "Oil-Cups;" and do hereby declare that the following is a full, clear, and exact description thereof, reference being had to the accompanying drawings, and to the letters of reference marked thereon.

The nature of my invention consists in a transparent reservoir for oil, the neck of which is provided with a piece, projecting up in the bottom of the reservoir, to prevent dust and other sediment from passing out with the oil; the neck also being provided with a shoulder, to hold the rubber packing or gasket, when screwed into the cap; also in holding the oil-cup steady, by means of a strap; all of which will be hereinafter more fully set forth.

In order to enable others skilled in the art to which my invention appertains, to make and use the same, I will now proceed to describe its construction and operation, referring to the annexed drawings, which form a part of this specification, and which represent a side elevation in section of my invention.

A represents the oil-reservoir, made of glass, and the neck B of which is, at its lower end, provided with a shoulder, *a*.

The neck B projects up a suitable height, through the centre of the bottom of the reservoir, forming an annular recess, *e*, in which all the dust or sediment usually found in the oil is deposited, thus allowing the oil to pass out, through the opening or channel in the neck B, pure and clear.

The upper projecting part of the neck B may either be made solid with the neck, or an extra piece of some suitable material put into the same to form the annular recess.

Around the neck B is placed a rubber packing, or gasket, C, which rests on the shoulder *a*, and is screwed into the cap of the journal-box, the end of the neck touching the journal, or not, as may be desired. When screwed in the cap, the shoulder *a* holds the rubber gasket C, and prevents the cup from coming loose.

In addition to this, I place a strap, D, around the top of the reservoir, down the sides, and along the sides of the rubber packing C, so that when it is screwed into the cap, the ends of the strap D are held tightly in the same, thus giving an additional security to the reservoir.

In the top of the reservoir A is a stopper, E, which is taken out when the reservoir is to be filled with oil. Through the centre of the stopper E, I may place an air-valve, to admit sufficient air into the reservoir, so that the oil may flow easily.

The advantages of this improvement over all other lubricators can easily be seen: its great simplicity, consisting of only one piece, except the stopper, at the top; the flow of oil is easily regulated; there are no wires or loose tubes, which give either a too large or too small but never the right flow of oil.

Having thus fully described my invention,

What I claim as new, and desire to secure by Letters Patent, is—

The combination of the reservoir A, neck B, shoulder *a*, rubber gasket C, and strap D, all constructed and operating substantially as and for the purposes herein set forth.

In witness that I claim the foregoing, I have hereunto set my hand.

WILLIAM M. RENNYSON.

Witnesses:
C. M. ALEXANDER,
A. T. LEHMANN.